United States Patent Office 3,436,284
Patented Apr. 1, 1969

3,436,284
METHOD FOR THE PREPARATION OF ATOMICALLY CLEAN SILICON
Donald L. Klein, New Providence, N.J., assignor to Bell Telephone Laboratories, Incorporated, New York, N.Y., a corporation of New York
No Drawing. Filed Apr. 23, 1965, Ser. No. 450,504
Int. Cl. C23f *1/00;* C01b *33/02*
U.S. Cl. 156—17                  4 Claims

ABSTRACT OF THE DISCLOSURE

Atomically clean silicon surfaces may be attained by quenching a freshly etched silicon surface in a concentrated solution of iodine in an anhydrous solvent.

---

This invention relates to a technique for the preparation of atomically clean silicon surfaces.

In recent years, silicon has been prominently employed in the electronics industry in the fabrication of numerous devices. Typically, the silicon employed for such purposes is subjected to chemical etching at some stage in the processing, so resulting in the formation of a coating comprising an oxide film or a film comprising a mixture of oxides, hydroxides and fluorides, each of such films being hydrophobic in nature. Accordingly, it has been found necessary to alter such surfaces prior to use in order to obtain an atomically clean silicon surface that is hydrophillic in nature.

Heretofore, techniques directed to this end have involved sputtering in an argon ambient, crystal cleavage in vacuo, or heating in vacuo at temperatures of the order of 900° C. Unfortunately, these techniques have not been found completely satisfactory in that they may result in a disordering of the surfaces which requires repair by post-treatment annealing.

In accordance with the present invention, a technique for the preparation of atomically clean silicon surfaces is described wherein the noted prior art difficulties are effectively overcome. The inventive technique involves quenching a freshly etched silicon surface in a saturated solution of iodine in an anhydrous solvent. Surfaces so treated may then be stored in the solution until ready for use, at which time a sublimation treatment removes the iodine. Surfaces prepared in the described manner remain oxide free and in subsequent passivating procedures manifest a more uniform surface so that films can be grown or deposited on these surfaces with a lower incidence of imperfections than is attainable by the use of the prior art procedures. Further, these atomically clean surfaces find application in other areas of device technology such as the preparation of substrates for epitaxial semiconductor growth. As noted, the solutions employed in the practice of the present invention are saturated solutions of iodine in an anhydrous solvent. The solvents employed are required in the quenching medium in order to avoid hydrolysis of the silicon-iodine bonds. Solvents suitable in this use may be either organic or inorganic so long as they are anhydrous. Solvents found particularly useful for this purpose are halogenated hydrocarbons such as chloroform, trichloroethylene, et cetera, glacial acetic acid, and the alkyl alcohols having from 1–4 carbon atoms.

It has been theorized that freshly etched silicon surfaces possess free or dangling bonds which are ordinarily terminated by oxide, hydroxide or fluoride ions, so resulting in a hydrophobic surface. However, it has been found that iodine prevents the formation of oxides by being physically adsorbed upon the surface of the silicon, thereby acting as a barrier to further surface reactions such as air oxidation or fluoride ion attachment. On the other hand, with regard to fluorinated silicon surfaces, it has been suggested that the iodine displaces fluoride ions probably by the formation of soluble or gaseous interhalogen compounds or ions of the $IF_x$- or $IF_y$-type, respectively.

In order to provide maximum protection to the silicon surface, quenching must immediately follow removal of the silicon from the etching medium, that is, within a time period within the range of 1–3 seconds.

Following the quenching step, the desired silicon surface is obtained by subjecting the treated material to temperatures ranging from room temperature to 650° C. at atmospheric or subatmospheric pressures. It has also been found helpful when utilizing a vacuum system to employ a dry inert gas in order to minimize contamination of the silicon surface.

Examples of the present invention are described in detail below. The examples are included merely to aid in the understanding of the invention and variations may be made by one skilled in the art without departing from the spirit and scope of the invention.

EXAMPLE I (a) Three silicon slices, .012 x 0.5 x 0.5 inches, were chemically polished by dipping in a 19:1 $HNO_3$—HF solution and immediately withdrawn and quenched in a saturated solution of iodine in methyl alcohol. The treated slices were then subjected to a sublimation treatment by heating at 150° C. at atmospheric pressure in dry nitrogen. The resultant surface was hydrophillic as evidenced by subsequent water wetting.

(b) For comparative purposes, the procedure of Example I(a) was repeated with the exception that a water rinse was substituted for the quenching medium. The resultant surface was hydrophobic as evidenced by the balling up of water on the surface.

EXAMPLE II (a) The procedure of Example I(a) was repeated and oxide films formed on the silicon surfaces by steam oxidation for one hour at 1050° C. The resultant silica films were evaluated for the presence of imperfections with an amine-water-pyrocatechol etching system comprising a solution of 15 ml. of ethylenediamine, 7.1 ml. of water and 2.7 g. of pyrocatechol. The etching system was maintained at 110° C and the samples etched for 6 hours An average of 2.9 imperfections/mm.$^2$ were present.

(b) For comparative purposes, the procedure of Example II(a) was repeated with the exception that distilled water was substituted for the iodine quenching medium.

The resultant films evidenced an average of 17 imperfections/mm.²

EXAMPLE III

The procedure of Example II(a) was repeated with the exception that a saturated solution of iodine in carbon tetrachloride was employed. The resultant films evidenced an average imperfection density similar to that described in Example II(a).

What is claimed is:

1. A method for treating a silicon surface which comprises immediately quenching a freshly etched silicon surface in a saturated solution of iodine in an anhydrous solvent and subjecting the resultant surface to temperatures ranging from room temperature to 650° C.

2. A method in accordance with the procedure of claim 1 wherein said solvent is methyl alcohol.

3. A method in accordance with the procedure of claim 1 wherein said solvent is carbon tetrachloride.

4. A method in accordance with the procedure of claim 1 wherein said silicon surface is etched with a nitric acid-hydrofluoric acid mixture prior to quenching.

References Cited

UNITED STATES PATENTS 3,262,825    7/1966    Fuller _____ 156—17

JACOB H. STEINBERG, *Primary Examiner.*

U.S. Cl. X.R.

23—223.5; 134—3, 41; 148—15, 185; 252—79.4